Patented Dec. 23, 1952

2,623,063

UNITED STATES PATENT OFFICE 2,623,063

CHEMOTHERAPEUTIC COMPOUNDS

Erwin Schwenk and Bradley Whitman, Montclair, N. J., assignors to Schering Corporation, Bloomfield, N. J., a corporation of New Jersey No Drawing. Application September 20, 1948, Serial No. 50,251

7 Claims. (Cl. 260—500)

The invention relates to a new group of compounds having important chemotherapeutic activity. More specifically, the invention relates to new diaminodiphenylsulfone derivatives which are characterized by high bactericidal activity and a low oral toxicity.

A principal object of this invention is the provision of a group of diaminodiphenylsulfones characterized by a combination of phyical and chemical properties whereby aqueous solutions of the compounds may be secured. Furthermore, the new diaminodiphenyl sulfones are especially effective, since, unlike the sulfanilamides and most other sulfone derivatives, they are not antagonized by p-aminobenzoic acid; and, in addition, they have the unusual property of preventing the development of influenza virus and viruses of atypical pneumonia from propagating.

The new diaminodiphenylsulfone derivatives of the invention may be represented by the following general formula:

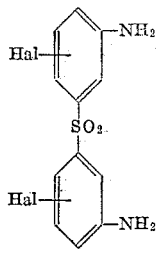

wherein Hal stands for chlorine, bromine or iodine, and derivatives thereof wherein at least one of the amino hydrogens is replaced by a water solubilizing group. Typical water solubilizing groups are

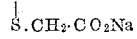
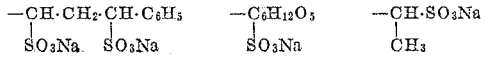

—CONH·naphthyl·(SO$_3$Na)$_x$, wherein $x$ is 1, 2 or 3, —CO·CH$_2$·Y·CH$_2$·CO$_2$Na, wherein Y is O, S, S—S, SO or SO$_2$, —CONH·C$_6$H$_4$·NHCO·NH·naphthyl·(SO$_3$Na)$_x$ wherein $x$ is 1, 2, 3, —CO·R·CO$_2$Na wherein R is a divalent hydrocarbon radical, —CO·CH$_2$·SO$_3$Na, —CH$_2$·SCH$_2$·COONa, —SO$_2$·naphthyl·(SO$_3$Na)$_x$, wherein $x$ is 1, 2 or 3, =CH·CH·(SO$_3$Na)$_2$, =CH·C$_6$H$_4$·SO$_3$Na, and =CH·C$_6$H$_4$·CO$_2$Na.

In the solubilizing groups other alkali and alkaline earth metal salts and organic amine salts may be used instead of the sodium salts.

In the closely related sulfanilamide field it has been found that compounds containing meta-substituted amino groups almost without exception completely lack bactericidal activity. The amino group in any position other than the para-position renders the compounds of little clinical value. In general, nuclear substitution in the sulfanilamides also brings about a remarkable decrease in activity. Therefore, it was most unexpected that where both the placing the amino group in other than the para-position and nuclear substitution were employed, activity of a high order should be found.

The compounds of the invention may be prepared by the nitration of the appropriately substituted halogenated diphenyl sulfone. For example, nitration of 4,4'-dichlorodiphenylsulfone readily yields the 3,3'-dinitro derivative. Reduction of the nitro group is readily accomplished by any of the known methods. The resulting 3,3'-diamino-4,4'-dichlorodiphenylsulfone may then be converted by use of solubilizing groups hereinabove-mentioned to compounds which are stable in aqueous solution. The following halogenated sulfones, which are representative of typical starting compounds, can be converted to the desired diamino compounds: 2,2'-dichlorodiphenylsulfone, 2,4'-dichlorodiphenylsulfone, 4,4'-dibromodiphenylsulfone, and 4-bromo-4'-chlorodiphenylsulfone.

The following examples are illustrative of the methods and compounds of the invention:

*Example I*

The substance having the structural formula

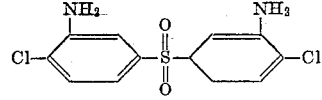

is prepared as follows:

To 1 l. of H$_2$SO$_4$ is added 200 g. of 4,4'-dichlorodiphenylsulfone and the mixture warmed until solution has taken place. One l. of yellow fuming nitric acid is then slowly added with stirring and cooling. The reaction mixture is warmed for an hour on the steam bath. The reaction mixture is then cautiously added to ice and water and the product collected by filtration. After drying, there is obtained 250–258 g. of the dinitro product melting at 199–201° C. which is sufficiently pure for use in the succeeding step.

The nitro groups may be reduced to amino groups by any of the known methods, as for example by Raney nickel and hydrogen, or by heating with stannous chloride in concentrated hydrochloric acid. The free base melts at 158–9° C.

*Example II*

The substance having the structural formula

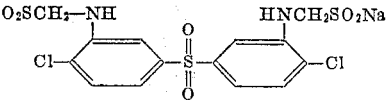

is prepared as follows:

A mixture of 15 g. of sodium formaldehydesulfoxylate and 16 g. of 4,4'-dichloro-3,3'-diamino diphenylsulfone is added portionwise, with stirring, to 45 cc. of glacial acetic acid at room temperature. The bulk of the acetic acid is removed under vacuum. The residue is taken up in methanol and precipitated with ether. The precipitate is dissolved in 40 cc. of water and neutralized with sodium bicarbonate. After adding 300 cc. of methanol and 50 cc. of ether, the solution is filtered and the filtrate poured into ether. After chilling, the disodium sulfoxylate derivative is collected by filtration.

*Example III*

The substance having the structural formula

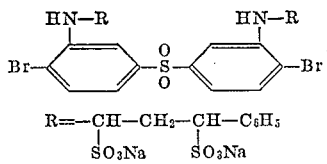

$R = -CH-CH_2-CH-C_6H_5$
      $|$           $|$
      $SO_3Na$    $SO_3Na$ is prepared as follows:

The nitration of 4,4'-dibromodiphenylsulfone is carried out by the procedure of Example I and the resulting dinitro compound is reduced with hydrogen and Raney nickel catalyst at a pressure of three atmospheres. The 4,4'-dibromo-3,3'-diaminodiphenylsulfone is then condensed in the known manner with cinnamaldehyde and sodium bisulfite.

*Example IV*

The substances having the structural formula

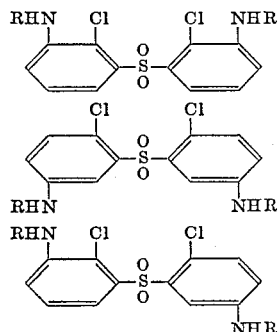

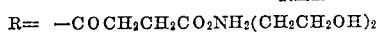

$R = -COCH_2CH_2CO_2NH_2(CH_2CH_2OH)_2$ are prepared as follows:

The nitration of 2,2'-dichlorodiphenylsulfone is carried out following the procedure of Example I. A mixture of the 3-3', 5-5' and 3-5' dinitro isomers is obtained. These are separated into the three isomeric substances. Reduction of the nitro groups to the amino groups, there is obtained 2,2'-dichloro-3,3'-diaminodiphenylsulfone, 2,2'-dichloro - 5,5' - diaminodiphenylsulfone and 2,2'-dichloro-3,5'-diaminodiphenylsulfone. Each of these is then condensed with succinic anhydride followed by the formation of diethanol amine salt.

We claim:

1. Compounds of the general formula

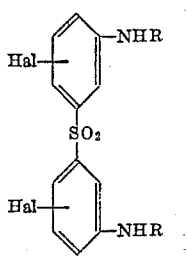

wherein Hal is a halogen selected from the group consisting of chlorine and bromine and R is a member of the group consisting of —$CH_2SO_2Na$, $-CH_2-CH_2-CH_2-C_6H_5$
  $|$            $|$
  $SO_2Na$     $SO_3Na$ and —$COCH_2CH_2CO_2NH_2(CH_2CH_2OH)_2$.

2. Compounds of the general formula

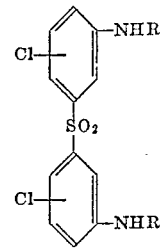

wherein R is a member of the group consisting of —$CH_2SO_2Na$, $-CH_2-CH_2-CH_2-C_6H_5$
  $|$            $|$
  $SO_3Na$     $SO_3Na$ and —$COCH_2CH_2CO_2NH_2(CH_2CH_2OH)_2$.

3. New substances of the general formula

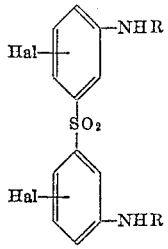

wherein Hal represents halogen and R represents —$CH_2SO_2Na$.

4. New substances of the general formula

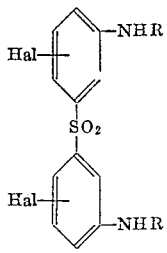

wherein Hal represents halogen and R represents $-CH-CH_2-CH-C_6H_5$
  $|$          $|$
  $SO_2Na$   $SO_3Na$ 5. New substances of the general formula

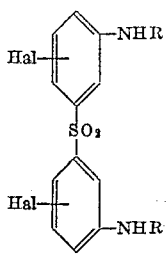

wherein Hal represents halogen and R represents —$COCH_2CH_2CO_2NH_2$—$(CH_2CH_2OH)_2$.

6. The substance of the formula

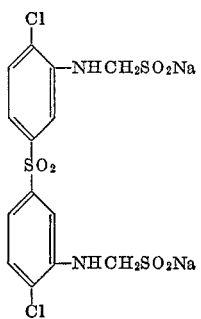

7. The substance of the formula

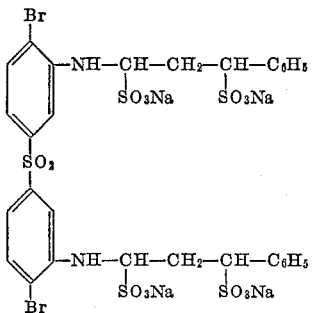

ERWIN SCHWENK.
BRADLEY WHITMAN.

REFERENCES CITED

The following references are of record in the file of this patent:

UNITED STATES PATENTS

| Number | Name | Date |
|---|---|---|
| 1,948,330 | Calvert | Feb. 20, 1934 |
| 2,224,156 | Kharasch | Dec. 10, 1940 |
| 2,256,575 | Raiziss | Sept. 23, 1941 |
| 2,268,754 | Kharasch | Jan. 6, 1942 |

FOREIGN PATENTS

| Number | Country | Date |
|---|---|---|
| 490,364 | Great Britain | Aug. 9, 1938 |
| 829,926 | France | July 11, 1938 |

OTHER REFERENCES

Martinet, Compte Rend. de l'Academic des Sciences, vol. 173, p. 777 (1921).

Machek et al., J. Crak Chem., vol. 160, pages 41–64 (1940).

Iris et al., Rev. Inst. Salubridad Enfermedad Trop. (Mex.), vol. 5, pages 75–81 (1944).

Friedlander, Proc. Soc. Exptl. Biol. Med., vol. 63 (1946), pp. 361–364.

Lorenz, Fiat #18 of German Science "Chemotherapy," pages 277–279.